Nov. 22, 1932.   E. A. BOHLMAN ET AL   1,888,343

OUTLET BOX

Filed Nov. 9, 1928

Inventors
Ernest A. Bohlman
Henry Brachtl
By Chindahl Parker & Carlson
Attys

Patented Nov. 22, 1932

1,888,343

UNITED STATES PATENT OFFICE

ERNEST A. BOHLMAN AND HENRY BRACHTL, OF CHICAGO, ILLINOIS, ASSIGNORS, BY MESNE ASSIGNMENTS, TO APPLETON ELECTRIC COMPANY, OF CHICAGO, ILLINOIS, A CORPORATION OF ILLINOIS

OUTLET BOX

Application filed November 9, 1928. Serial No. 318,162.

The invention relates to outlet boxes used in affording wiring outlets or the like in electrical installations and more particularly relates to improvements in the means for connecting a box of this type to a conduit.

An object of the invention is to provide an outlet box having new and improved means for securing the box to a conduit which eliminates the necessity of providing threads or other securing means upon the conduit and which engages the conduit in such manner that a rigid union therebetween is effected. In attaining this end the invention provides an interengaging part which is arranged to be forced into rigid mechanical engagement with both the conduit and the outlet box in such manner that relative movement therebetween is positively prevented.

Another object of the invention is to provide a new and improved device of this character which is simple and sturdy in construction and may be easily and rapidly applied to the end of the conduit.

Other objects and advantages will become apparent from the following description and in the accompanying drawing in which.

Figure 1:
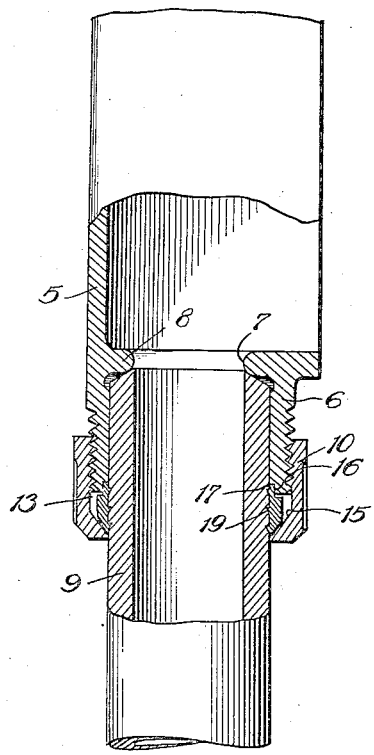
Figure 1 is a fragmentary elevation of an outlet box secured to a conduit, the connection therebetween being shown in central section.
Figure 2:
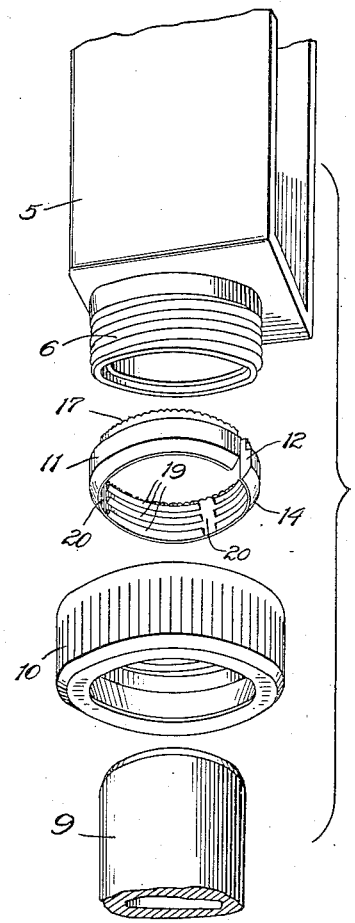
Fig. 2 is a disassembled view of the parts in elevation.

Although the invention is susceptible of various modifications and alternative constructions, we have shown and herein described in detail the preferred embodiment but it is to be understood that we do not thereby intend to limit the invention to the specific form disclosed but intend to cover all modifications and alternative constructions falling within the spirit and scope of the invention as expressed in the appended claims.

In attaining the objects of the invention the outlet box is provided with a fitting arranged snugly to receive the end of an electrical conduit. The connection between the fitting and the conduit comprises a split ring which is capable of being forced into rigid clamping engagement with the peripheral surface of the conduit and at the same time may be forced into mechanical engagement with the fitting to prevent relative movement therebetween.

More particularly described, the reference numeral 5 indicates generally an outlet box, of any suitable character, having one or more nipples 6 extending from the walls thereof and secured thereto in any preferred manner as by integral formation with the box. The nipple 6 is tubular in form and defines an aperture 7 which provides a passage-way into the interior of the box. Preferably the aperture 7 is somewhat smaller in diameter than the inner diameter of the nipple 6 thereby forming an annular inwardly extending shoulder 8 which serves as a limiting abutment for the end of a conduit 9. Externally, the nipple 6 is screw threaded to receive an internally screw threaded tubular nut or gland 10 which permits the conduit 9 to extend therethrough into the nipple.

The means with which the conduit is gripped and held securely comprises, in this embodiment, a clamping ring 11 split axially, as at 12, and preferably formed of resilient metal such as hardened steel. The clamping ring, in its relation to the other parts, occupies a recess 13 formed adjacent the screw threads within the gland 10 and a tapered surface 14 formed at one side of the outer surface of the ring is adapted to engage a complementary tapered surface 15 provided interiorly of the gland.

Preferably the tapered surface 14 upon the ring is slightly arcuate in order to provide what may be termed a line contact between the ring and the gland. Such contact lessens the frictional engagement between the surfaces and permits the relative rotation between the gland and the ring, which will be presently described, to occur more easily. Thus, as the gland is screwed upon the nipple, with the ring interposed therebetween, the abutment of one end face of the ring with the end of the nipple prevents longitudinal movement of the ring while the engagement of the complementary tapered surfaces 14 and 15 draws the split edges of the ring together and constricts the ring into clamping engagement with the conduit.

Figure 3:
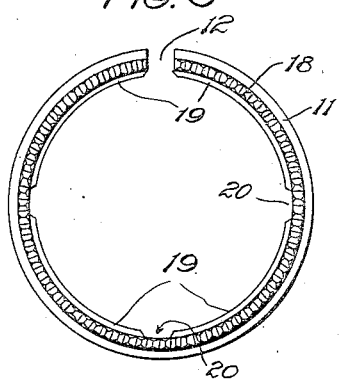
Fig. 3 is an enlarged end view of the clamping ring looking downwardly of the ring as shown in Fig. 1.
Figure 4:
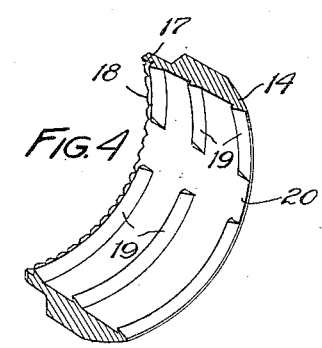
Fig. 4 is an enlarged fragmentary view and perspective of the clamping ring.

Means is also provided insuring a positive mechanical engagement between the abutting ends of the nipple and clamping ring in order to prevent relative rotation therebetween as the gland is screwed upon the nipple. As illustrated herein, the outer end of the nipple is interiorly rabbeted to provide a groove 16. The ring 11 is also rabbeted exteriorly to provide an annular flange 17 extending axially therefrom to engage the groove 16 on the nipple. The end face of the flange 17 is serrated as at 18 (Fig. 3) to provide a plurality of short, relatively sharp teeth capable of cutting or biting into the surface of the nipple.

By this construction as the gland is screwed on the nipple the flange 17 will be drawn into engagement with the groove 16 and the serrations on the flange will cut or bite into positive locking engagement with the nipple. The interfitting relation of the engaging faces of the ring and nipple is advantageous in that it forms a centering means for positioning the ring properly and further holds the ring against tipping or tilting during tightening of the assembly, thus insuring a positive, uniform, gripping action upon the conduit.

While it is contemplated that a clamping force of ample strength to hold the ring and conduit rigidly together may be obtained by this construction, means is preferably provided which increases the clamping and holding action therebetween. In the present instance, this end is attained by forming a plurality of annular projections or ribs 19 on the inner surface of the clamping ring 11. These projections are preferably triangular in cross section, thus providing sharp, projecting cutting edges which are forced to bite into a surface of the conduit as the clamping action of the ring proceeds. Preferably the annular projections 19 are interrupted, as at 20, in a number of places, in order to insure that the ring will close uniformly throughout its circumference, and also to provide a plurality of sharp ends on the annular projections which facilitate the biting action thereof.

Manipulation of the device and use is exceedingly simple. The outlet box is supplied to the trade with the parts in assembled relation, that is with the gland 10 screw threaded a short distance upon the nipple 6 with the clamping ring 11 interposed therebetween. It is only necessary therefore, in order to mount the box upon a conduit, to insert the end of the conduit into the box until the conduit abuts the shoulder 8 and then to screw the gland upon the nipple. This draws the clamping ring into abutment with the end of the nipple and the engagement of the complementary tapered surfaces constricts the conduit to force the projections thereon into the surface of the conduit. At the same time the sharp serrations 18 are driven into the end of the nipple.

In this manner, the outlet box is rigidly secured to the end of the conduit in such a way that relative longitudinal movement therebetween is impossible, inasmuch as the sharp projections 19 hold the end of the conduit against the limiting abutment 8 and present relative longitudinal withdrawal of the conduit from the box. Moreover, the engagement of the serrations with the nipple prevent relative rotational movement therebetween and insures a firm uniform gripping action of the ring about the nipple, thus frictionally resisting rotational movement between the conduit and box.

It will be apparent from the foregoing that an outlet box has been provided having an improved means for securing the box to the end of an electrical conduit, which means provides ample rigidity to the union, is simple in construction and may be easily applied.

We claim as our invention:

1. An outlet box comprising, in combination, a box body having an aperture through one of the walls thereof, a tubular externally screw-threaded nipple on said body about said aperture, an internally screw-threaded gland capable of being screwed upon said nipple and of permitting a conduit to be inserted through said gland into said nipple, a split ring positioned within said gland and arranged to abut the outer end of said nipple, a flange on the abutting face of said ring, a plurality of sharp projections upon the abutting face of said flange, said nipple being annularly recessed to receive said flange and to be engaged by the serrations thereon as the gland is screwed upon the nipple, and a plurality of sharp interrupted projections running circumferentially about the inner face of said ring and adapted to bite into the outer surface of said conduit as the gland is screwed upon the nipple.

2. An outlet box comprising, in combination, a box body having an externally screw threaded nipple thereon providing a passageway into the interior of the body, an internally screw threaded gland capable of being screwed upon the nipple and of permitting the insertion of a conduit through said gland and into said nipple, a split clamping ring positioned within said gland arranged to encircle said conduit and to be moved into engagement with the end face of said nipple as said gland is screwed thereon, and means upon the end face of said ring arranged to be forced into the surface of said nipple as said gland is screwed thereon to hold said ring against rotation, said ring and said gland having complementary engaging surfaces thereon arranged to constrict said ring about the surface of the conduit as said gland is screwed upon said nipple.

In testimony whereof we have hereunto affixed our signatures.

ERNEST A. BOHLMAN.
HENRY BRACHTL.